United States Patent [19]

Rostoker

[11] 4,396,432

[45] Aug. 2, 1983

[54] PROCESS FOR CONVERTING COAL TO GASEOUS FUEL WITH PRODUCTION OF PORTLAND CEMENT AS A BY-PRODUCT

[75] Inventor: William Rostoker, Chicago, Ill.

[73] Assignee: University of Illinois Foundation, Chicago, Ill.

[21] Appl. No.: 338,611

[22] Filed: Jan. 11, 1982

[51] Int. Cl.³ .............................................. C04B 7/02
[52] U.S. Cl. ................................... 106/100; 106/103
[58] Field of Search ................ 106/100, 103; 208/8 R

[56] References Cited

U.S. PATENT DOCUMENTS 1,728,828   9/1929   Hendrickx ........................... 106/100
4,260,421   4/1981   Brown et al. ....................... 106/103

Primary Examiner—James Poer
Attorney, Agent, or Firm—Merriam, Marshall & Bicknell

[57] ABSTRACT

Continuous process for converting coal to gaseous fuel with production of Portland cement as a by-product comprises the step of pelletizing a mixture of finely divided coal and limestone, heating (coking) the pellets in a reducing gas atmosphere to liberate volatile fuel products, and converting a substantial proportion of the residual carbon in the pellets to CO and hydrogen by the water-gas reaction, the inorganic constituents of the coal being simultaneously converted to Portland cement clinkers.

5 Claims, 2 Drawing Figures

PROCESS FOR CONVERTING COAL TO GASEOUS FUEL WITH PRODUCTION OF PORTLAND CEMENT AS A BY-PRODUCT

The present invention relates to an improved method for conversion of coal into gaseous and liquid fuels, and more particularly to such a process in which the ash content of the coal is converted to Portland cement, while the sulfur content thereof is fixed in a form which reduces atmospheric pollution.

BACKGROUND OF THE INVENTION

With the increasing cost and decreasing availability of petroleum and natural gas, greater emphasis is being placed on the use of coal as a source of energy. Several processes have been developed whereby coal can be converted to a variety of liquid and gaseous products useful as fuel or as feedstocks for chemical conversion to other desired products. In any such process, however, a serious problem which must be overcome is the disposition of large amounts of ash, representing the inorganic constituents of the coal, which has little or no economic value. In addition, and particularly in the case of coal containing relatively large amounts of sulfur, the sulfur-containing gases, such as $SO_2$, $SO_3$, and $H_2S$ which are formed in the process present serious problems with respect to corrosion of equipment or pollution of the atmosphere. While these problems can be solved by the use of special corrosion-resistant equipment and by treatment of effluent gases to remove sulfur compounds, these expedients increase the cost of any process for utilizing coal in this manner and render the economics unfavorable in comparison to the use of petroleum-based products or natural gas.

BRIEF DESCRIPTION OF THE INVENTION

The problems of ash disposal, atmospheric pollution and corrosion of equipment in known processes for converting coal to liquid and gaseous products are solved in accordance with the invention by mixing the coal with an appropriate concentration of limestone, which reacts with the inorganic constituents of the coal during the process to produce Portland cement, which can be used or sold as a valuable by-product. In the process, the sulfur content of the coal combines with a portion of the added limestone to form solid products which appear ultimately in the Portland cement product in concentrations sufficiently small to have no adverse effect on the quality of the cement. By suitable temperature control and by maintaining reducing conditions throughout the process, the appearance of sulfur in any gas phase is suppressed, thereby eliminating the necessity for scrubbing any of the gaseous product streams to remove sulfur.

Briefly described, the process of the invention involves the steps of preparing an intimate mixture of finely divided coal and finely divided limestone, pelletizing the mixture with the aid of an appropriate binder, and heating (coking) the pellets in a reducing gas atmosphere to liberate normally gaseous ($H_2$, CO, $CH_4$) products, volatilized higher hydrocarbons, and ammonia, which are recovered in conventional fashion. After coking, the pellets are treated at an elevated temperature in the presence of limited amounts of oxygen and water to convert, via the known water-gas reaction, a substantial proportion of the residual carbon to CO and hydrogen, a portion of the carbon content being oxidized to carbon monoxide to supply the energy requirements of the endothermic water-gas reaction, as well as to heat the mineral constituents to a temperature sufficiently high to produce Portland cement. The resulting solid product, containing the sulfur content of the original coal in solid form, is then cooled and ground to produce Portland cement for use or sale. The gaseous products, all having substantial value as fuel or chemical reactants, are recovered in conventional fashion.

DESCRIPTION OF THE DRAWINGS

The invention will be better understood from the detailed description which follows, in conjunction with the accompanying drawings, in which.

DETAILED DESCRIPTION

Figure 1:
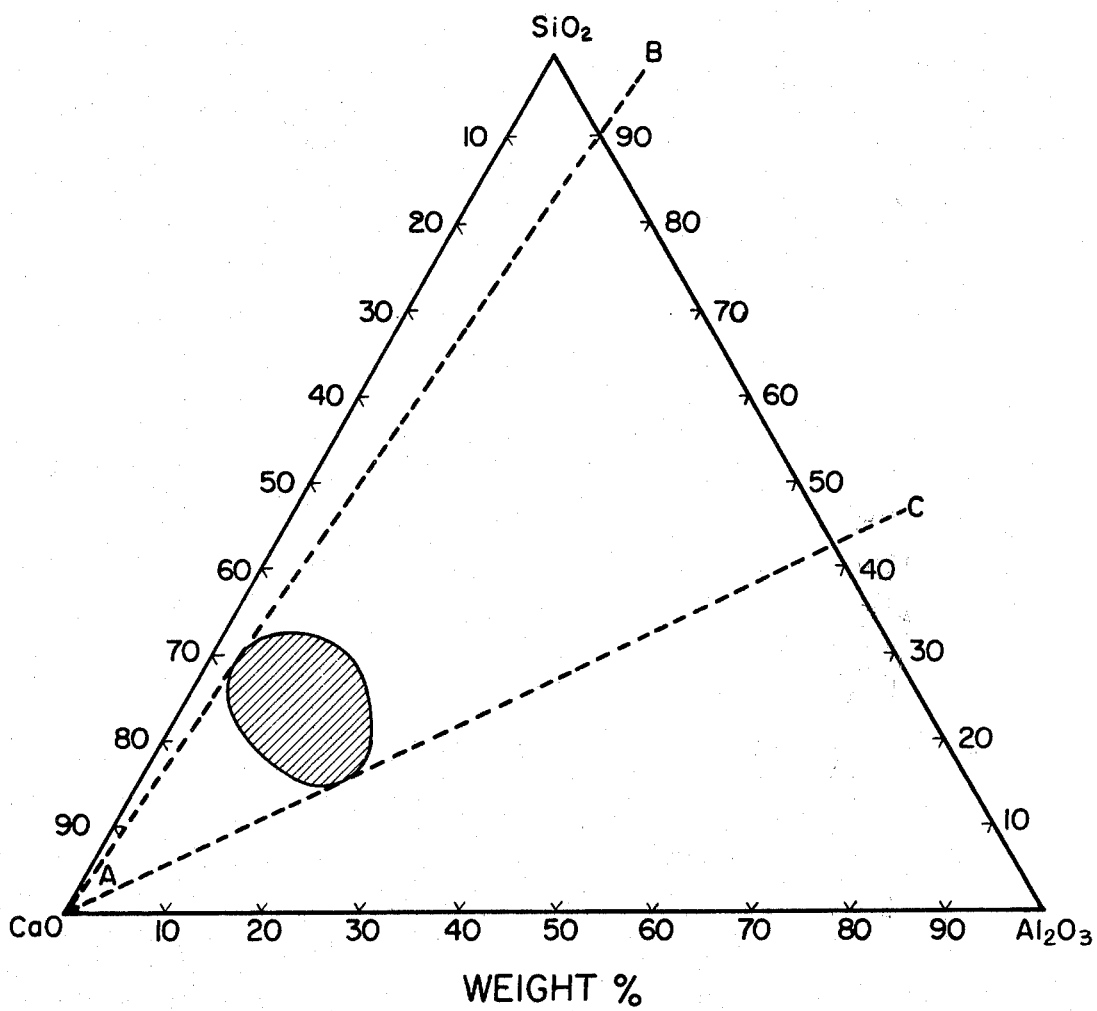
FIG. 1 is a ternary diagram of the system $CaO-Al_2O_3-SiO_2$, representing the major constituents of Portland cement, the shaded area in the diagram representing the compositions which can produce useful Portland cement.

Portland cement is a mixture of basic calcium silicates, calcium aluminates, and optionally calcium ferrites obtained by calcining an intimate mixture of lime and clay and pulverizing the resulting clinkers. Portland cement can be considered as containing three components, namely CaO, $Al_2O_3$ and $SiO_2$ in appropriate proportions. FIG. 1 is a ternary diagram of these three components with the shaded area representing the zone of useful Portland cement compositions. (See *The Chemistry of Cements*, edited by H. F. W. Taylor, page 61, Academic Press, 1964). In FIG. 1, the dotted lines AB and AC, which are tangent to the shaded area representing Portland cement compositions, show that a mixture of $Al_2O_3$ and $SiO_2$ containing from about 43% to about 90% $SiO_2$ can be converted to a composition representative of Portland cement by addition of an appropriate concentration of CaO, sufficient to bring the composition of the resulting mixture within the shaded zone in FIG. 1.

Coal contains a major proportion of carbon and minor proportions of hydrocarbons and inorganic constituents containing sulfur (typically pyrite, $FeS_2$) as well as inorganic materials such as silica, clay, limestone, alkali sulfates and magnesia. A typical coal can be considered as containing about 60% carbon, 25% hydrocarbons, 10% ash and 1% sulfur. Although actual coals can vary widely in their composition, such variations can be accommodated in the present process as will hereinafter become apparent.

Coal ash contains substantial proportions of both $SiO_2$ and $Al_2O_3$, a typical composite analysis being 37% $SiO_2$, 19% $Al_2O_3$, 29% $Fe_2O_3$ (from combustion of pyrite, $FeS_2$), 5% CaO, plus minor amounts of bound $SO_3$, S, and water. Although coal ash thus contains an appropriate ratio of $SiO_2$ and $Al_2O_3$ for forming a Portland cement composition by the addition of CaO, the presence of a relatively large concentration of $Fe_2O_3$ and other iron oxides has heretofore prevented the use of coal ash for this purpose. The unreduced iron oxides in the mixture lead to the formation of a high proportion of dicalcium alumino-ferrite which has very poor bonding properties and thus adversely effects the crushing strength of Portland cement containing any substantial proportion of these materials.

In accordance with the invention, the adverse effects of the presence of pyrite in the coal, as a source of corrosive sulphur-containing gases produced during processing and undesirable iron oxides in the ash, is overcome by maintaining an intimate association of lime (CaO) with the coal during the high temperature processing thereof, in the presence of an atmosphere which is strongly reducing, e.g., mixtures of CO and $H_2$. Under these conditions, the sulphur is prevented from entering into a gaseous phase, in accordance with the following potential, high-temperature reactions, noting that above about 700° C., $FeS_2$ thermally dissociates to FeS and S:

$$CaO + FeS + CO \rightarrow CaS + CO_2 + Fe \quad (a)$$

$$CaO + S + CO \rightarrow CaS + CO_2 \quad (b)$$

$$CaO + SO_2 + 3CO \rightarrow CaS + 3CO_2 \quad (c)$$

$$CaO + H_2S \rightarrow CaS + H_2O \quad (d)$$

$$CaO + SO_2 + \tfrac{1}{2}O_2 \rightarrow CaSO_4 \quad (e)$$

$$CaO + H_2S + 2O_2 \rightarrow CaSO_4 + H_2O \quad (f)$$

Thus, in a properly reducing atmosphere at elevated temperatures, the sulphur content of the coal is converted to a solid state, as CaS, FeS or $CaSO_4$. Further, the iron content of the pyrite appears in the final product as solid iron or FeS, both of which are essentially inert ingredients when incorporated in a Portland cement composition.

Since the pyrite content of coal is distributed throughout the coal, it cannot interact with lime until brought into intimate contact therewith. Accordingly, the first step in the process of the invention is to grind both the coal and the limestone to an appropriately fine particle size, suitably below about 150 microns.

Figure 2:
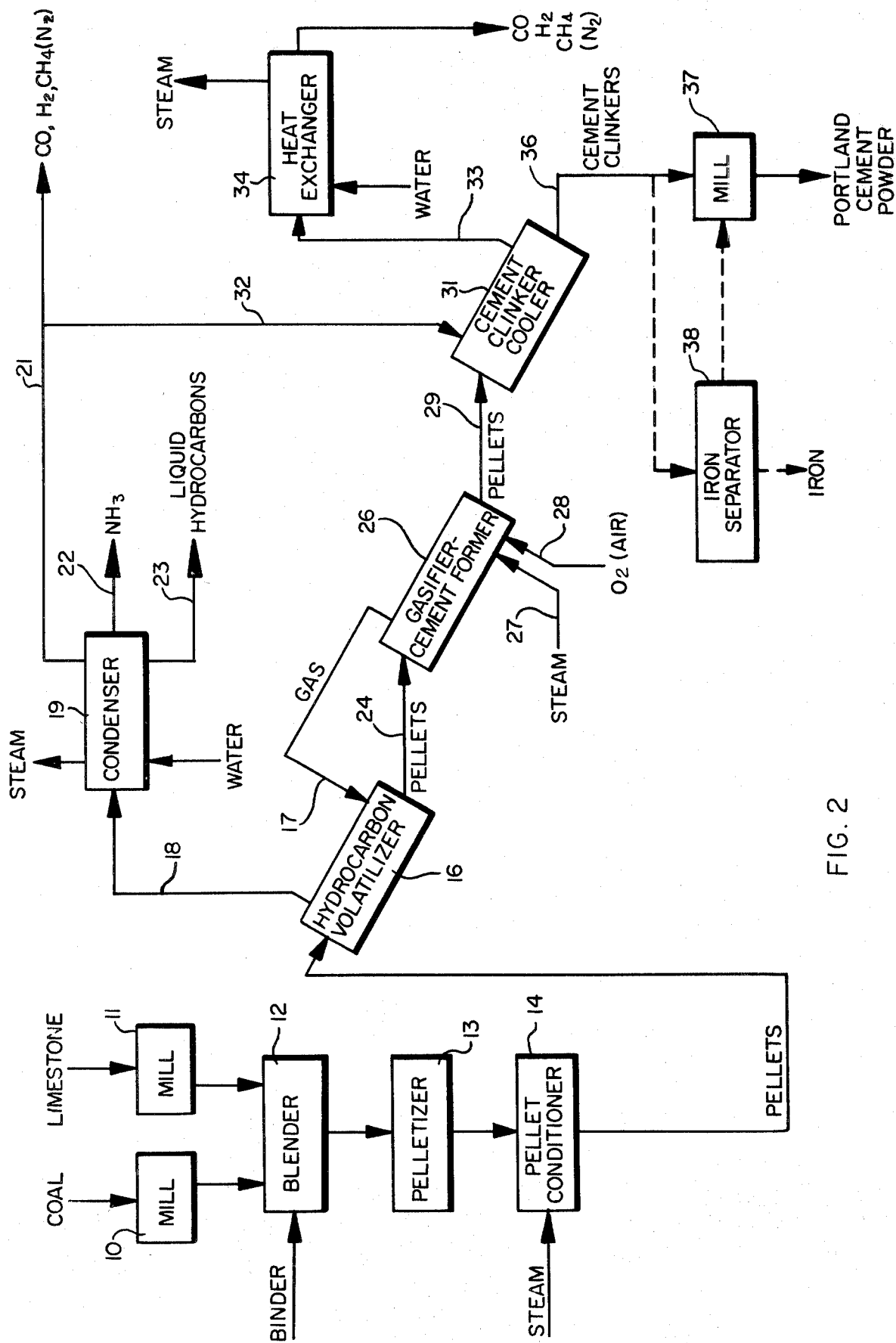
FIG. 2 is a block diagram of the process of the invention.

Referring to FIG. 2, coal and limestone are supplied respectively to mills 10 and 11, wherein these materials are ground to sizes below about 150 microns. The proportion of limestone which is added to the coal depends on the $SiO_2$ and $Al_2O_3$ contents of the coal and should be sufficient to produce in the ash the appropriate proportions of these components in accordance with FIG. 1. There should also be added a sufficient quantity of limestone to react with and fix the sulphur content of the coal in solid form as previously discussed.

The finely-divided coal and limestone are then blended in blender 12 with an appropriate amount of a suitable binder, preferably Portland cement. Other binders, such as bentonite or tar, capable of withstanding the high temperature processing conditions and supplying sufficient strength properties to prevent sagging or densification of the pellets can be used.

The mixture of coal, limestone, and binder is passed to pelletizer 13, wherein the mixture is formed into pellets of convenient size, suitably about 1 cm in diameter. Pelletizing in this manner is advantageous in tending to maintain uniform and reproducible rates of reaction of the components therein as well as limiting the formation of fines which might otherwise create a dust burden in the gaseous by-product streams.

From pelletizer 13, the pellets pass to pellet conditioner 14 wherein steam is added to cause the Portland cement binder to harden. The steam conditioning step can be omitted or modified as necessary, if a binder other than Portland cement is used.

From pellet conditioner 14, the pellets pass to hydrocarbon volatilizer 16, suitably an inclined rotary kiln. While passing through volatilizer 16, the pellets are heated by a countercurrent stream of hot gases entering volatilizer 16 through line 17. The gases, consisting principally of hydrogen and carbon monoxide, enter at an elevated temperature above about 1,000° C., sufficient to heat the coal pellets passing through volatilizer 16 to coking temperature (600° C.), causing the evolution of normally gaseous hydrocarbons, such as methane and ethane, and volatile hydrocarbons of higher molecular weight, and leaving a residue of solid carbon. The evolved gases from the coal, together with the gas stream entering through line 17, pass via line 18 to condenser 19, wherein the gases are condensed and separated in conventional fashion to produce a stream 21 of normally gaseous materials such as CO, $H_2$, methane and ethane, a stream 22 of ammonia and a stream 23 of normally liquid hydrocarbons, all of which can be used as fuel or chemical reactants in accordance with conventional practice.

The coked pellets leaving volatilizer 16 through line 24 enter gasifier-cement former 26, also suitably an inclined rotary kiln, which is supplied at its other end with steam entering through line 27 and oxygen or air, entering through line 28. Within gasifier-cement former 26, the steam reacts with part of the carbon content of the pellets to produce a mixture of carbon monoxide and hydrogen in accordance with the water-gas reaction $$C + H_2O \rightarrow CO + H_2.$$

The water-gas reaction is a well-known process for producing gaseous fuel from carbon. The process is endothermic, however, and requires a input of energy to make the reaction proceed. The necessary energy is supplied by reacting a portion of the carbon content of the pellets with a limited amount of oxygen in accordance with the reaction $$2C + O_2 \rightarrow 2CO$$

which is exothermic and produces sufficient heat not only to maintain the water-gas reaction, but also to raise the temperature within gasifier-cement former 26 to a sufficiently high temperature (above about 1500° C.) to effect the interdiffusion process which leads to the formation of Portland cement. By suitably adjusting the proportions of steam and oxygen introduced to gasifier-cement former 26, relative to the carbon content of pellets entering through line 24, substantially all of the carbon in the pellets can be converted to a gaseous fuel consisting of carbon monoxide and hydrogen, while simultaneously causing the ash to react with the added lime to produce Portland cement. The relative proportions of the reactants required to accomplish this result can be determined in conventional fashion, as will be apparent to those skilled in the art.

The residual pellets leaving gasifier-cement former 26 through line 29 are substantially depleted of their carbon content and, by reason of the heat treatment in unit 26, are converted to clinkers of Portland cement. The clinkers are at an elevated temperature, however, and contain substantial amounts of sensible heat, which can be recovered by heat exchange in cement clinker cooler 31 with the aid of a sidestream 32 withdrawn from product gas stream 21. The hot gases leaving cooler 31 through line 33 then pass through heat exchanger 34 wherein the sensible heat content is recovered in any suitable fashion, e.g., by the generation of steam as shown.

The cooled cement clinkers leaving cooler 31 through line 36 are ground in mill 37 to produce the product Portland cement powder.

The clinkers leaving cooler 31 can contain a proportion of iron in metallic form. If so, as an optional feature of the invention, some or all of these clinkers can be sent to iron separator 38 wherein the iron is removed by suitable, e.g., magnetic, means and the treated clinkers sent to mill 37 for grinding as previously described.

In gasifier-cement former 26, there must be introduced a limited amount of oxygen, sufficient to partially oxidize a portion of the coal content of the pellets to CO, in order to maintain the energy requirements of the water-gas reaction and the cement diffusion process which occur within the unit. It is preferred that the oxygen be supplied as a pure stream, rather than as atmospheric air. Although air can be used as the source of oxygen, the nitrogen content of air dilutes the fuel value of the product gases, increases the volumetric load on the apparatus, and may also serve as a source of contaminants ($NO_x$) in the product gases.

The process of the invention is illustrated by the following example.

EXAMPLE

There is fed to the process of the invention 1,000 lb. of coal containing about 600 lb. of carbon, 250 lb. of hydrocarbons, 100 lb. of ash (containing about 36 lb. of $SiO_2$) and about 10 lb. of sulfur. The coal is mixed with about 200 lb. of limestone and about 10 lb. of Portland cement (binder) and the mixture is formed into pellets.

For conversion of this quantity of feed coal, there is supplied to the gasifier-cement former about 1,290 lb. of oxygen (of which about 860 lb. is used for combustion of carbon to CO) and about 380 lb. of steam.

The products obtained include about 140 lb. of Portland cement (including about 20 lb. CaS, 30 lb. Fe, and 10 lb. of bentonite). The product gas streams consist of about 200 lb. hydrocarbons, 100 lb. of hydrogen and 1400 lb. of carbon monoxide.

It will be seen that the process of the invention eliminates or substantially reduces two of the major problems encountered in converting coal to fuel and chemical feedstocks, by suppressing the production of corrosive and polluting sulphur-bearing gases during the conversion process, and by producing a solid product which, unlike the valueless ash usually produced when coal is burned, is a valuable Portland cement by-product.

The foregoing detailed description has been given for clearness of understanding only, and no unnecessary limitations should be understood therefrom as modifications will be obvious to those skilled in the art.

What is claimed is:

1. A continuous process for converting coal to Portland cement and liquid and gaseous fuels comprising the steps of
    (a) mixing finely divided coal with sufficient finely divided limestone to provide in the mixture an appropriate ratio of Portland cement-forming constituents, measured as CaO, $SiO_2$ and $Al_2O_3$,
    (b) forming the mixture from step (a) into discrete pellets,
    (c) heating said pellets in a reducing atmosphere at an elevated temperature sufficient to release the volatile constituents of said coal as a fuel product stream,
    (d) converting a major proportion of the carbon content of the residual pellets from step (c) to carbon monoxide and hydrogen by reaction with steam at an elevated temperature,
    (e) reacting the residual solid product from step (d) with a limited proportion of oxygen to convert the remaining carbon content thereof to CO, the heat evolved being sufficient to achieve Portland cement-forming temperatures, and maintaining said temperature for a time sufficient to form Portland cement clinkers;
    (f) recovering the gases produced in steps (d) and (e); and
    (g) grinding said clinkers to produce Portland cement powder.

2. The process of claim 1 wherein the gases produced in steps (d) and (e) are fed to step (c) as said reducing atmosphere.

3. The process of claim 2 wherein said coal and said limestone have a particle size less than about 150 microns.

4. The process of claim 3 wherein said said pellets are formed with Portland cement as a binder.

5. The process of claim 1 wherein metallic iron present in said clinkers is separated therefrom prior to step (g).

* * * * *